July 11, 1933.   N. H. WATTS   1,918,070
ELECTRICAL CORD TERMINAL
Filed Jan. 24, 1927   2 Sheets-Sheet 1
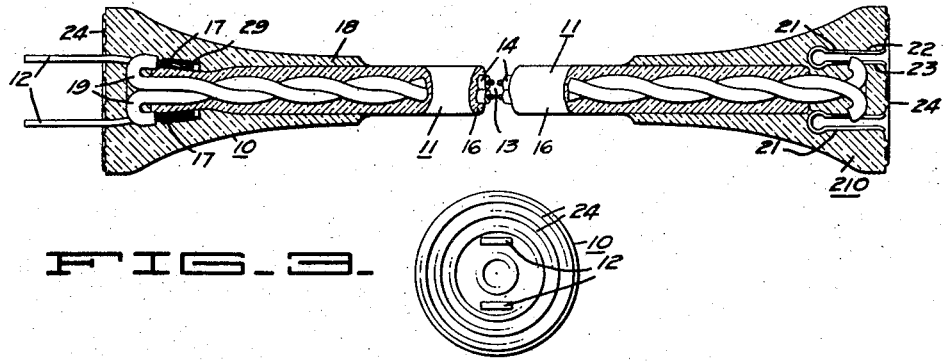
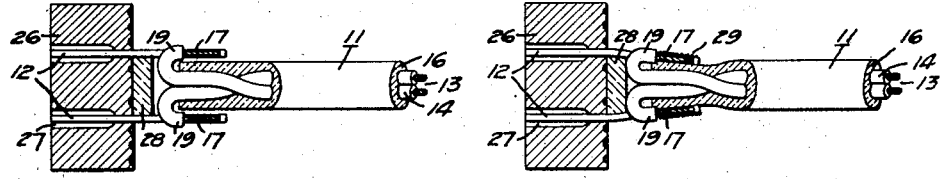
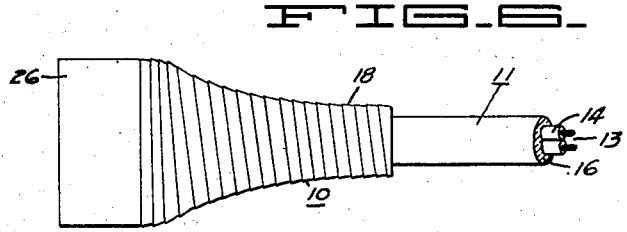
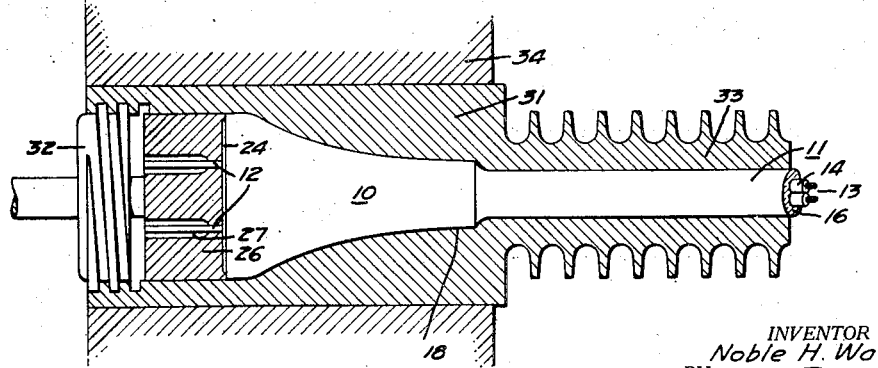
INVENTOR
Noble H. Watts
BY White, Prost & Fryer
his ATTORNEYS July 11, 1933.  N. H. WATTS  1,918,070
ELECTRICAL CORD TERMINAL
Filed Jan. 24, 1927    2 Sheets-Sheet 2

INVENTOR
Noble H. Watts
BY White, Prost & Fryer
his ATTORNEYS

Patented July 11, 1933

1,918,070

UNITED STATES PATENT OFFICE

NOBLE H. WATTS, OF OAKLAND, CALIFORNIA, ASSIGNOR, BY MESNE ASSIGNMENTS, TO GENERAL ELECTRIC COMPANY, OF SCHENECTADY, NEW YORK, A CORPORATION OF NEW YORK

ELECTRICAL CORD TERMINAL

Application filed January 24, 1927 Serial No. 163,012.

This invention relates generally to connection terminals suitable for electrical cords.

It is an object of this invention to devise a connection terminal for an electrical cord which will be substantially indestructible.

It is the further object of this invention to devise a connection terminal which will be sealed against external vapors and liquids.

It is a further object of this invention to devise a cord terminal which will have no exposed screws, wires or other metal parts and which will not short circuit.

It is the further object of this invention to devise a novel connection terminal which will incorporate a resilient insulating material such as rubber.

It is the further object of this invention to provide against breaking of the connections between the conductors and contacts in a cord terminal constructed substantially entirely of resilient material.

It is the further object of this invention to devise an electrical cord which will obviate the necessity of having separate or individual insulation for each of the conductors.

It is another object of this invention to devise a novel method of constructing a cord terminal of resilient material.

Another object of this invention is to devise a novel apparatus for carrying out the above method.

Further objects of this invention will appear from the following description in which I have set forth the preferred embodiment of my invention. It is to be understood that the appended claims are to be accorded a range of equivalents consistent with the state of the prior art.

Referring to the drawings:

Fig. 1 is a side elevational view in cross section of one modification of this invention.

Fig. 2 is a side elevational view in cross section showing another modification of this invention.

Fig. 3 is an end view of the terminal shown in Fig. 1.

Figs. 4, 5, 6 and 7 illustrate steps in the method of forming the terminal.

Figure 8:
Figs. 8 and 9 illustrate the method of forming a cord with naked conductors.

The invention comprises generally an electrical cord terminal which is constructed of a resilient material such as rubber. Thus referring to Fig. 1 of the drawings there is shown a connection terminal of the bayonet type comprising a body 10 positioned upon the end of an electrical cord 11. The body is constructed of what is ordinarily known as soft vulcanized rubber, or of other suitable resilient material which is insulating in character. Inserted in the body member are the metal bayonet contacts 12, which in this case are shaped and spaced so that the terminal corresponds to a standard cord plug. The cord 11 in this instance consists of a plurality of flexible electrical conductors 13 which are provided with individual insulation 14 and with a common outer insulating sheath 16. The end of these conductors adjacent the contacts 12 are soldered or otherwise permanently connected to the inner ends of contacts 12 as indicated at 17.

The body 10 preferably includes an extension 18 of reduced diameter which surrounds that portion of the cord adjacent the contacts 12 and thus prevents the breakage of the conductors due to too acute bending of the conductors where they enter the body. This extension has a graduated reduction in diameter so that when the cord is pulled to one side, it will bend gradually and evenly as it enters the body. In order to provide a combined terminal and cord which will be entirely vapor and liquid proof, the sheath 16 of the cord is also constructed of resilient material such as rubber, and this sheath is bonded directly to the body to provide a vapor and liquid proof connection. Thus when constructing the device out of rubber, the body is directly vulcanized to the sheath by the application of heat so that the extension 18 merges into the sheath and an integral structure is formed.

As the resilient body may be stretched or elongated a certain amount in handling the terminal, provision must be made to prevent such stretching from breaking the connections between the conductors and contacts. This is accomplished by providing loops 19 in the conductors adjacent contacts 12, these loops also serving to prevent breakage of the conductors due to relative movement between the contacts.

In Fig. 2 there has been illustrated a socket type of terminal incorporating the features of this invention. This socket terminal is adapted to make connection with a bayonet type of terminal such as shown in Fig. 1, or with any standard form of bayonet plug. In this terminal the clip contacts 21 have been substituted for the bayonet contacts 12. These clips 21 are shown as constructed out of a strip of spring metal bent U-shaped to provide opposed branches 22 and 23 and are embedded into the body 210. In molding the resilient material the spaces between the branches of the clips are kept clear so as to permit the insertion of bayonet contacts. In this instance the resilient material of the body serves to yieldingly press the branches of the contacts 21 together and to permit limited relative movement between the contacts, thus insuring good electrical connection with bayonet contacts. In both of the connection terminals of Figs. 1 and 2, I have shown the use of circular ribs 24 upon the faces of terminals, these ribs being for the purpose of resiliently pressing against the face of a complementary connection device in order to prevent entrance of vapors or liquids.

One novel method of constructing a connection terminal as described above has been illustrated in Figures 3 to 6 inclusive. Referring first to Fig. 4; the sheath 16 of the cord 11 is first stripped back from the end of the cord and then the individual insulation is stripped from the conductors 13. The bayonet contacts 12 are retained in spaced relationship by means of a plug 26 having apertures 27 for receiving the contacts. A block 28 of uncured rubber is then inserted between contacts 12 to form a portion of the resilient body. The conductors 13 are soldered to the contacts and the end of cord 11 thrust between the contacts and against the rubber block 28. As shown in Fig. 5 the projecting ends of the contacts are then compressed against opposite sides of the cord sheath and retained in position as by means of a cord wrapping 29. Uncured rubber is then applied to that portion of the cord adjacent to the plug 26, this rubber being preferably applied in the form of rubber strips or ribbon which is tensioned and wound around the cord. This wrapping of rubber is made to conform generally to the shape desired for the body member as shown in Fig. 6. It will be noted that the cord forms a base upon which the terminal is constructed.

After the rubber has been applied the assembly is placed within a suitable mold where it is vulcanized. One form of mold which gives good results is shown in Fig. 7 and comprises a body portion 31 which is shaped interiorally to provide the desired contour for the finished terminal. The plug 25 slides within one end of this mold and may be forced inwardly to compress the rubber by means of the closure 32 which is threaded into the body 31. The mold is provided with a heat radiating extension 33 which surrounds that portion of the cord adjacent to the terminal for a purpose later to be described. The mold is then placed in a suitable oven where a vulcanizing heat is applied to body 31. In the drawings I have diagrammatically indicated an oven by the jacket 34. The radiating extension 33 reduces the temperature of the mold at the point where the cord enters the same thus obviating extension of the cord sheath at the point of exodus from the mold and making possible a smooth junction between the cord and the body. After the vulcanizing operation the mold is removed from the oven, plug 32 unscrewed to permit removal of the terminal, and plug 26 is removed from contacts 12. The rubber block 28 during the vulcanizing operation becomes merged with the other rubber of the body and the embedded portions of the contacts are permanently bonded to the rubber. To make this bonding possible these contacts are preferably made of brass, which material has the characteristic of bonding to rubber.

Figure 9:

Instead of using a rubber sheathed cord and then vulcanizing the body to the end of the same, it is obvious that both the body and the sheath for the cord may be vulcanized in one operation. Furthermore instead of employing an electrical cord which has the conductors provided with individual insulation, I may employ an electrical cord comprising naked electrical conductors embedded in a resilient insulating material. Thus as shown in Fig. 8, I propose to wrap a plurality of stranded or flexible conductors 36 and 37 about a stretched or tensioned insulating cord or core 38. These conductors are wound about the core 38 in such a manner as to form a plurality of helixes having a common axis and substantially the same pitch. However the pitch is made such that the separate conductors can be maintained in spaced relationship to form in effect a multi-threaded helix. The cord is preferably of soft fibrous material such as cotton impregnated with a gum or latex solution. As shown in Fig. 9 the conductors tend to embed themselves into the cord, thus preventing subsequent displacement. After wrapping the conductors upon the core both the core and conductors may be given a coating of insulating cement, such as a latex solution, for bonding the conductors in position. A sheath of resilient insulating material such as soft rubber is then vulcanized to the conductors to permanently embed them and maintain the same in spaced relationship. To facilitate bonding to the rubber, the strands of the conductors are preferably plated with tin.

Figure 10:
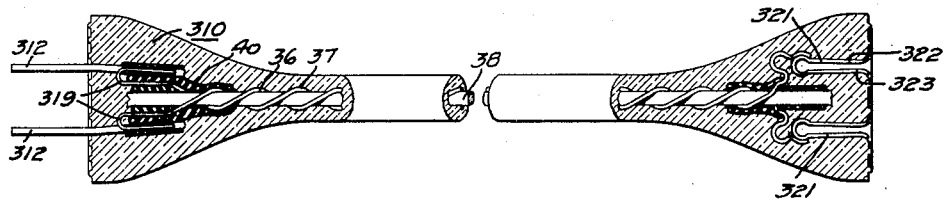
Fig. 10 is a side elevational view in cross section showing the cord terminal incorporating a cord having naked conductors.

The manner in which connection terminals may be attached to such a cord, is shown in Fig. 10. In this case the conductors 36 and 37 are spread at the ends of the cord and are embedded in the enlarged body portion 310. Rubberized tape 40, or other binding material, wrapped about the cord and conductors, tends to prevent unwrapping of the conductors and aids in anchoring the cord to the terminal body. Contacts 312 are embedded directly in the body 310 and the conductors are provided with loops 319 and are permanently attached to the contacts. The body and the sheath for the cord in this instance may be conveniently formed in one operation so that the body merges into the sheath. If it is desired to provide an extension cord, the other end of the cord may be provided with a complementary connection terminal as shown, which is similar to the terminal described with reference to Fig. 2.

The many practical advantages of a cord terminal such as described above will be readily apparent. The body being constructed substantially entirely of a resilient homogeneous mass, breakage, even when stepped upon or given a hard blow, is practically impossible. It may be used in places where it is subjected to liquids or vapors or other conditions which would cause deterioration and probably grounding or short circuiting of an ordinary terminal. As the connections between the conductors and contacts are embedded in the rubber, no short circuits can result from frayed conductor ends. It is obvious that the terminal may be incorporated with a short length of cord which may be spliced to another extension cord by an electrician, it may be built upon one end of a rubber sheathed extension cord, or an extension cord may be provided with a bayonet terminal on one end and a complementary socket terminal on its other end as shown in Fig. 10.

I claim:

1. In a device of the class described, an electrical cord, a contact secured to a conductor of the cord, a loop in the conductor adjacent the contact, and a body of insulating material embedding the contact and looped portion of the conductor.

2. In a device of the class described, a pair of spaced bayonet contact members, a body of resilient material serving to embed said members whereby projecting ends of said members form a bayonet connector, and means in addition to the material of said body for retaining together the inner ends of said members, said means together with the resilient material of the body permitting relative movement between the projecting ends of said contact members.

3. In a device of the class described, an electrical cord having a plurality of conductors, spaced contact members connected to adjacent ends of said cords, a mass of resilient material embedding said contacts and the connections to the conductors thereby providing for relative movement between the contacts, and additional means for binding said contacts together adjacent the connections to the conductors.

4. In a device of the class described, a pair of spaced bayonet contact members, a body of resilient material serving to embed said members whereby projecting ends of said members form a bayonet connector, binding means in addition to the material of said body for retaining together the inner embedded ends of said members, said binding means together with the resilient material of the body permitting relative movement between the projecting ends of said members, and conductors extended into said body and connected to the inner ends of said members.

5. In a device of the class described, a pair of spaced bayonet contact members, a body of resilient material serving to embed said members whereby projecting ends of said members form a bayonet connector, binding means in addition to the material of said body for retaining together the inner embedded ends of said members, said binding means together with the resilient material of the body permitting relative movement between the projecting ends of said members, and conductors extended into said body and connected to the embedded ends of said members adjacent said binding means, each conductor having an embedded loop adjacent its point of connection.

6. In a device of the class described, a rubber sheathed cord, spaced contact members, binding means for securing said members to opposite sides of one end of said cord, connections between the conductors of said cord and said members, and a body of resilient material embedding said members and the adjacent end of the cord.

7. In a device of the class described, an electrical cord, a contact member electrically connected to a conductor of said cord, means in addition to said connection for securing said contact member to said cord, and a body of resilient material embedding said contact member and the adjacent end of said cord.

8. In a device of the class described, an electrical cord, a contact member electrically connected to a conductor of said cord, a body of resilient material embedding said member and the adjacent end portion of said cord, said conductor having a loop near the point of connection with said contact member, and means in addition to said conductor and said body for anchoring said contact member to said cord.

9. A cord terminal of the bayonet type comprising an electrical cord, a pair of strip contact members electrically connected to conductors of said cord, and a body of resilient insulating material embedding corresponding portions of said members and the adjacent end portions of the cord, said body permitting relative movement between said contacts and deformation of the body, and loops formed in the conductors adjacent their connection to each contact member whereby the connection between the conductor and contact members will not be injured by such relative movement or deformation.

10. An electrical cord terminal consisting of a plurality of spaced electrical contacts, a resilient insulated sheathed cord having bared conductors protruding from the end thereof, the end of said cord being disposed between said contacts, said bared conductors being bent backwards on said cord sheathing and making electrical connection with said contacts at the free ends of said conductors in the rear of the bent portions therein, and a body of resilient insulated material embedding a portion of said contacts and adjacent cord.

11. An electrical cord terminal comprising spaced electrical contacts, a resilient insulated sheathed cord having bared conductors protruding from an end thereof, the end of said cord being disposed between said contacts, said bared conductors being bent backwards along said cord sheathing and electrically connected respectively to said contacts at the free ends of said conductors in the rear of the bent portions therein, and a body of resilient insulating material embedding said cord ends, portions of said contacts and the said connections between conductors and contacts.

In testimony whereof, I have hereunto set my hand.

NOBLE H. WATTS.